(12) United States Patent
Chang et al.

(10) Patent No.: US 10,139,284 B2
(45) Date of Patent: Nov. 27, 2018

(54) TEMPERATURE DISTRIBUTION MEASURING APPARATUS AND METHOD

(71) Applicant: Korea Basic Science Institute, Yuseong-gu, Daejeon (KR)

(72) Inventors: Ki Soo Chang, Daejeon (KR); Dong Uk Kim, Daejeon (KR)

(73) Assignee: KOREA BASIC SCIENCE INSTITUTE, Daejeon (KR)

( * ) Notice: Subject to any disclaimer, the term of this patent is extended or adjusted under 35 U.S.C. 154(b) by 145 days.

(21) Appl. No.: 15/508,357

(22) PCT Filed: Aug. 24, 2015

(86) PCT No.: PCT/KR2015/008795
§ 371 (c)(1),
(2) Date: Mar. 2, 2017

(87) PCT Pub. No.: WO2016/036038
PCT Pub. Date: Mar. 10, 2016

(65) Prior Publication Data
US 2017/0299440 A1    Oct. 19, 2017

(30) Foreign Application Priority Data
Sep. 3, 2014    (KR) .................. 10-2014-0116811

(51) Int. Cl.
*G01J 5/10*    (2006.01)
*G06K 9/46*    (2006.01)
(Continued)

(52) U.S. Cl.
CPC .............. *G01J 5/10* (2013.01); *G01K 11/125* (2013.01); *G06K 9/4661* (2013.01); *G06K 9/741* (2013.01);
(Continued)

(58) Field of Classification Search
CPC ..... G01J 5/10; G01J 2005/0077; G06K 9/741; G06K 9/4661; G01K 11/125;
(Continued)

(56) References Cited

U.S. PATENT DOCUMENTS

| | | | |
|---|---|---|---|
| 5,612,538 A | 3/1997 | Hackel et al. | |
| 7,173,245 B2 | 2/2007 | Shakouri et al. | |

(Continued)

FOREIGN PATENT DOCUMENTS

| | | |
|---|---|---|
| JP | S63234127 A | 9/1988 |
| JP | 2006308513 A | 11/2006 |

(Continued)

OTHER PUBLICATIONS

Int'l Search Report issued Dec. 3, 2015 in Int'l Application No. PCT/KR2015/008795.

(Continued)

*Primary Examiner* — David Porta
*Assistant Examiner* — Gisselle Gutierrez
(74) *Attorney, Agent, or Firm* — Panitch Schwarze Belisario & Nadel LLP (57) ABSTRACT

Disclosed is a temperature distribution measuring device for measuring the temperature distribution or the heat generation distribution in a sample. An embodiment collects a reflection signal the reflectivity of which changes on the basis of a bias signal applied to a sample, detects a signal of interest, which has been reflected from a region of interest in the sample, from the reflected signal, converts the signal of interest to a frequency range signal, calculates the relative amount of change in reflectivity of the sample by using a direct current component extracted on the basis of filtering of the frequency range signal and a frequency component of the bias signal, and acquires a thermal image of the sample on the basis of the relative amount of change in reflectivity.

20 Claims, 7 Drawing Sheets

(51) Int. Cl.
*G06K 9/74* (2006.01)
*H04N 5/33* (2006.01)
*H04N 5/349* (2011.01)
*H04N 5/355* (2011.01)
*H04N 5/365* (2011.01)
*G01K 11/12* (2006.01)
*G01J 5/00* (2006.01)

(52) U.S. Cl.
CPC .............. *H04N 5/33* (2013.01); *H04N 5/349* (2013.01); *H04N 5/3559* (2013.01); *H04N 5/3655* (2013.01); *G01J 2005/0077* (2013.01); *G01K 2213/00* (2013.01)

(58) Field of Classification Search
CPC .. G01K 2213/00; H04N 5/349; H04N 5/3655; H04N 5/33; H04N 5/3559
USPC ...................................................... 250/341.1
See application file for complete search history.

(56) References Cited

U.S. PATENT DOCUMENTS

| | | | |
|---|---|---|---|
| 8,362,431 | B2 | 1/2013 | Hudgings et al. |
| 2009/0221932 | A1 | 9/2009 | Butz et al. |
| 2011/0317156 | A1* | 12/2011 | Lee ................... G01N 21/8901 356/237.2 |
| 2015/0316496 | A1* | 11/2015 | Chang ................... H01L 22/12 374/5 |
| 2017/0299440 | A1* | 10/2017 | Chang ....................... G01J 5/10 |

FOREIGN PATENT DOCUMENTS

| | | | |
|---|---|---|---|
| JP | 2012078179 | A | 4/2012 |
| KR | 20100119288 | A | 11/2010 |
| KR | 20120071048 | A | 7/2012 |
| KR | 101336946 | B1 | 12/2013 |
| KR | 101350976 | B1 | 1/2014 |
| KR | 20140025980 | A | 3/2014 |
| WO | 2012086942 | A2 | 6/2012 |
| WO | 2014084574 | A1 | 6/2014 |

OTHER PUBLICATIONS

Logan et al, "Calculation of Temperature Distribution and Temperature Noise in a Pyroelectric Detector-I. Gas-Filled Tube," Infrared Physics, vol. 13, pp. 37-47 (1973).

Claeys et al., "Absolute Dynamic Measurements of Temperature Changes in Electronic Components from a Thermoreflectance Optical test Probe", Laboratoire de Microelectronique, pp. 378-384, 1993.

Extended European Search Report dated Mar. 22, 2018 in EP Application No. 15839017.9.

* cited by examiner

TEMPERATURE DISTRIBUTION MEASURING APPARATUS AND METHOD

CROSS-REFERENCE TO RELATED APPLICATIONS

This application is a Section 371 of International Application No. PCT/KR2015/008795, filed Aug. 24, 2015, which was published in the Korean language on Mar. 10, 2016, under International Publication No. WO 2016/036038 A1, the disclosure of which is incorporated herein by reference.

TECHNICAL FIELD

The present invention relates to a method and apparatus for measuring a temperature distribution or a heat distribution of a sample.

BACKGROUND ART

Due to high integration or miniaturization of a semiconductor device, a heat generated during an operation of the semiconductor device may degrade a performance and a reliability of the semiconductor device.

The conventional temperature distribution measuring apparatus may measure infrared radiation emitted from a sample using an infrared camera, which is referred to as an infrared thermal imaging method. The infrared thermal imaging method may have a high temperature resolution. The infrared thermal imaging method may measure a temperature distribution of a sample by detecting a mid-infrared radiation. The infrared thermal imaging method may have a spatial resolution of about 3 µm due to an optical diffraction limit. Thus, there is a desire for a sub-micron high-resolution temperature distribution measuring apparatus to be used for measuring and analyzing a temperature characteristic of a micropattern or highly integrated semiconductor device.

There is a prior art, Korean Patent Registration No. 10-1350976 (Title: Temperature distribution measuring device) filed on Dec. 22, 2010 and registered on Jan. 14, 2014. The prior art relates to a temperature distribution measuring device for contactlessly measuring a temperature distribution of a sample having a three-dimensional (3D) structure and, more particularly, to a temperature distribution measuring device for measuring a 3D temperature distribution of a sample, the device including a chromatic dispersion lens, a diffraction spectroscope, and a photodetector array to measure a temperature distribution in a depth direction (a z-axial direction) of the sample based on a thermal reflection method and to measure a temperature distribution in a parallel direction (an x-y-axis direction) of the sample using a biaxial scanning mirror based on the thermal reflection method.

DISCLOSURE OF INVENTION

Technical Goals

An aspect of the present invention provides technology for measuring a periodical change in reflectivity without synchronization of a light detector with respect to a bias signal applied to a sample.

An aspect of the present invention provides technology for removing a reflected light occurring in regions other than a region of interest of a sample and securing a large dynamic range of a light detector, thereby improving a sensitivity of measuring a change in a reflectivity.

Technical Solutions

According to an aspect of the present invention, there is provided a temperature distribution measuring apparatus including a collector configured to collect a reflection signal having a reflectivity varying based on a bias signal applied to a sample, a detector configured to detect, from the reflection signal, a signal of interest reflected from a region of interest of the sample, and a controller configured to convert the signal of interest into a frequency domain signal, calculate a relative amount of change in reflectivity of the sample using a frequency component of the bias signal and a direct current component extracted based on a filtering of the frequency domain signal, and acquire a thermal image of the sample based on the relative amount of change in reflectivity.

The detector may include at least one pinhole.

The controller may be configured to calculate the relative amount of change in reflectivity using an equation $\Delta R_f/R_0$, $R_0$ being the direct current component included in the frequency domain signal and $\Delta R_f$ being the frequency component of the bias signal included in the frequency domain signal.

According to an aspect of the present invention, there is provided a temperature distribution measuring apparatus including a bias signal applier configured to apply a bias signal to a sample for a change in reflectivity of a signal reflected from the sample, a scanner configured to scan the sample based on a first control signal indicating a start and an end of an image and a second control signal indicating a start and an end of a row or a column of the image, a detector configured to detect, from the reflection signal, a signal of interest reflected from a region of interest of the sample, and a controller configured to convert the signal of interest into a frequency domain signal, calculate a relative amount of change in reflectivity of the sample using a frequency component of the bias signal and a direct current component extracted based on a filtering of the frequency domain signal, determine a pixel value of the image as the relative amount of change in reflectivity, and acquire a thermal image of the sample.

The controller may be configured to obtain a thermoreflectance coefficient based on the relative amount of change in reflectivity and a thermoreflectance coefficient measurement method, and acquire a temperature distribution image of the sample by applying the thermoreflectance coefficient to the thermal image.

According to an aspect of the present invention, there is provided a temperature distribution measurement method including collecting a reflection signal having a reflectivity varying based on a bias signal applied to a sample, detecting, from the reflection signal, a signal of interest reflected from a region of interest of the sample, converting the signal of interest into a frequency domain signal and calculating a relative amount of change in reflectivity of the sample using a frequency component of the bias signal and a direct current component extracted based on a filtering of the frequency domain signal, and acquiring a thermal image of the sample based on the relative amount of change in reflectivity.

The temperature distribution measurement method may further include scanning the region of interest of the sample based on a first control signal indicating a start and an end of an image and a second control signal indicating a start and an end of a row or a column of the image.

When a period of the bias signal is less than a pixel unit time which is a time corresponding to a unit pixel of the image, the acquiring of the thermal image may include using the relative amount of change in reflectivity for each pixel of the image as a pixel value of the each pixel and acquiring the thermal image by two-dimensionally arranging the pixel value based on the first control signal and the second control signal.

When a period of the bias signal is greater than or equal to a pixel unit time which is a time corresponding to a unit pixel of the image, the converting of the signal of interest into a frequency domain signal may include sampling the signal of interest for each pixel unit time, acquiring a plurality of reflection images by two-dimensionally arranging a reflectivity corresponding to the sampled signal of interest based on the first control signal and the second control signal, and calculating the relative amount of change in reflectivity based on the reflectivity corresponding to a pixel in the same location in the plurality of reflection images.

Effects

According to an aspect of the present invention, it is possible to easily measure a periodical change in reflectivity without synchronization of a light detector with respect to a bias signal applied to a sample.

According to an aspect of the present invention, it is possible to remove a reflected light occurring in regions other than a region of interest of a sample and secure a large dynamic range of a light detector, thereby improving a sensitivity of measuring a change in a reflectivity.

BEST MODE FOR CARRYING OUT THE INVENTION

Hereinafter, example embodiments will be described in detail with reference to the accompanying drawings.

It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Figure 1:
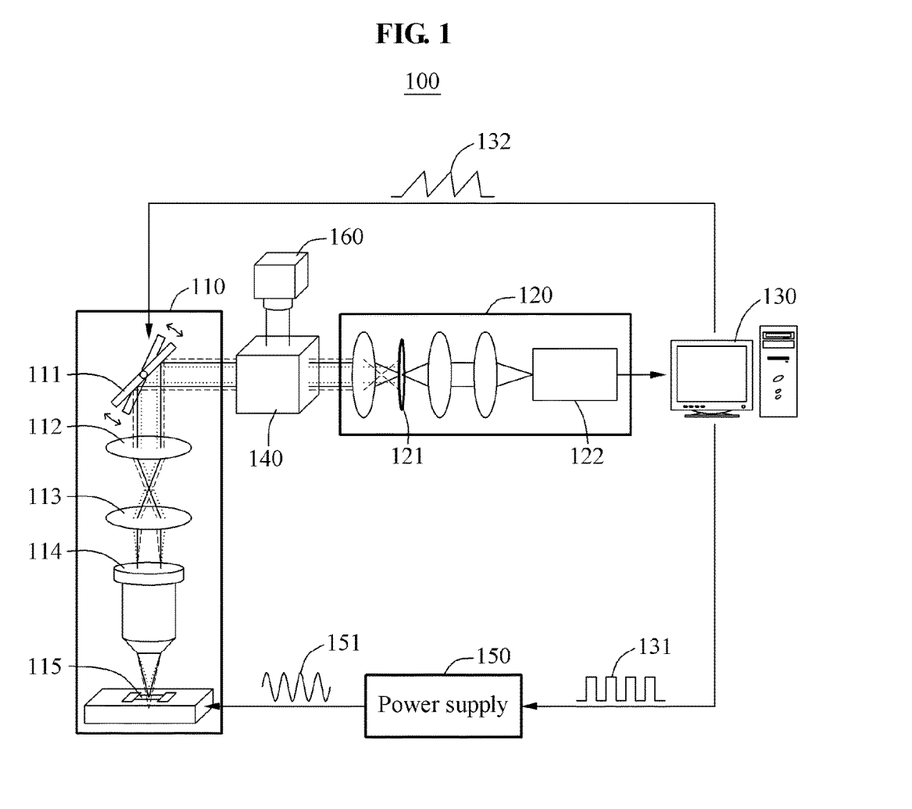
FIG. 1 is a diagram illustrating a temperature distribution measuring apparatus according to an example embodiment.

FIG. 1 is a diagram illustrating a temperature distribution measuring apparatus according to an example embodiment. The temperature distribution measuring apparatus may measure a temperature distribution on a surface of an active semiconductor device such as an integrated circuit, a microelectromechanical (MEMS) device, and a thermoelectric cooler. Also, the temperature distribution measuring apparatus may measure an internal temperature distribution of an encapsulated semiconductor device or a semiconductor device having a metal layer. The temperature distribution measuring apparatus may be used to analyze a heating characteristic of the semiconductor device.

Referring to FIG. 1, a temperature distribution measuring apparatus 100 may include a collector 110, a detector 120, and a controller 130.

The collector 110 may collect a reflection signal having a reflectivity varying based on a bias signal 151 applied to a sample 115. For example, the sample may be a semiconductor device. The temperature distribution measuring apparatus 100 may measure a heat distribution on a surface of the semiconductor device. Also, the temperature distribution measuring apparatus 100 may measure an internal heat distribution of the semiconductor device. The controller 130 may transmit a trigger signal 131 to the power supply 150 to operate a power supply 150. The power supply 150 may apply the bias signal 151 to the sample 115. The bias signal 151 may be expressed as "$I=I_0[1+\cos(2\pi ft)]$".

In response to the bias signal 151 being applied to the sample 115, a heat may be generated in the sample 115 based on a Joule effect. The heat generated in the sample 115 in response to the bias signal 151 being applied to the sample 115 may be represented by Equation 1.

$$P = I^2 \times r = (I_0 + I_0\cos(2\pi ft))^2 r \quad \text{[Equation 1]}$$
$$= \{I_0^2 + 2I_0^2\cos(2\pi ft) + I(I_0\cos(2\pi ft))^2\}r$$
$$= \left\{I_0^2 + 2I_0^2\cos(2\pi ft) + \frac{I_0^2}{2}(1 + \cos(2\pi ft))^2\right\}r$$
$$= \left\{\frac{3}{2} + 2\cos(2\pi ft) + \frac{1}{2}\cos(2\pi 2ft)\right\}I_0^2 r$$

In Equation 1, I denotes an alternating current flowing through the sample 115 and $I_0$ denotes a direct current (DC)

component of the alternating current I. Also, in Equation 1, r denotes a resistance, that is, the sample 115, and f denotes a frequency of a bias signal, for example, to the alternating current I.

When the bias signal 151 is applied to the sample, a temperature of the sample 115 may increase.

While the bias signal 151 is applied, a light source 160 may output a signal to monitor the sample 115. The output signal may be radiated to the sample 115 through an optical distributor 140, a galvanometer scanner 111, a scan lens 112, a tube lens 113, and an object lens 114. The signal radiated to the sample 115 may be reflected by the sample 115. In response to the bias signal 151 being applied to the sample 115, the heat may be generated in the sample 115. A refractive index of the sample 115 and an intensity of the reflection signal reflected from the sample 115 may vary based on the generated heat. A reflectivity of the sample may vary based on a change in the refractive index of the sample 115.

$$R(x, y) = R_0(x, y) + \Delta R(x, y) \quad \text{[Equation 2]}$$
$$= R_0(x, y) + \Delta R_{DC}(x, y) + \Delta R_f(x, y)\cos(2\pi f t) +$$
$$\Delta R_{2f}(x, y)\cos(2\pi 2 f t)$$

In Equation 2, $R_0(x, y)$ denotes the reflectivity of the sample 115 to which the bias signal 151 is not applied. Also, in Equation 2, $\Delta R(x, y)$ denotes an amount of change in reflectivity of the sample 115 to which the bias signal 151 is applied. The reflectivity of the sample 115 may vary at a DC, a frequency being equal to f, and a frequency being equal to 2 f. At the DC, the frequency being equal to f, and the frequency being equal to 2 f, the amount of change in reflectivity of the sample 115 may occur. According to Equations 1 and 2, the amount of change in reflectivity of the sample 115 may be maximized at the frequency being equal to f.

$$\frac{\Delta R(x, y)}{R(x, y)} = \kappa \cdot \Delta T(x, y) \quad \text{[Equation 3]}$$

In Equation 3, $\Delta R$, $R$, $\kappa$, and $\Delta T$ denote an amount of change in reflectivity, a reflectivity, a thermoreflectance coefficient, and a change in temperature of the sample 115, respectively.

The detector 120 may detect a signal of interest reflected from a region of interest of the sample 115 from the reflection signal. For example, the detector 120 may include at least one pinhole 121. Only a signal reflected from a desired focal plane may pass the pinhole 121, and remaining signals may not pass the pinhole 121.

The detector 120 may include a light detector 122. The light detector 122 may measure an intensity of a signal of interest. The light detector 122 may detect an amount of change in intensity of the signal of interest, and the amount of change in intensity may indicate an amount of change in reflectivity of the sample 115. Related descriptions will be provided with reference to FIG. 2.

Figure 2:
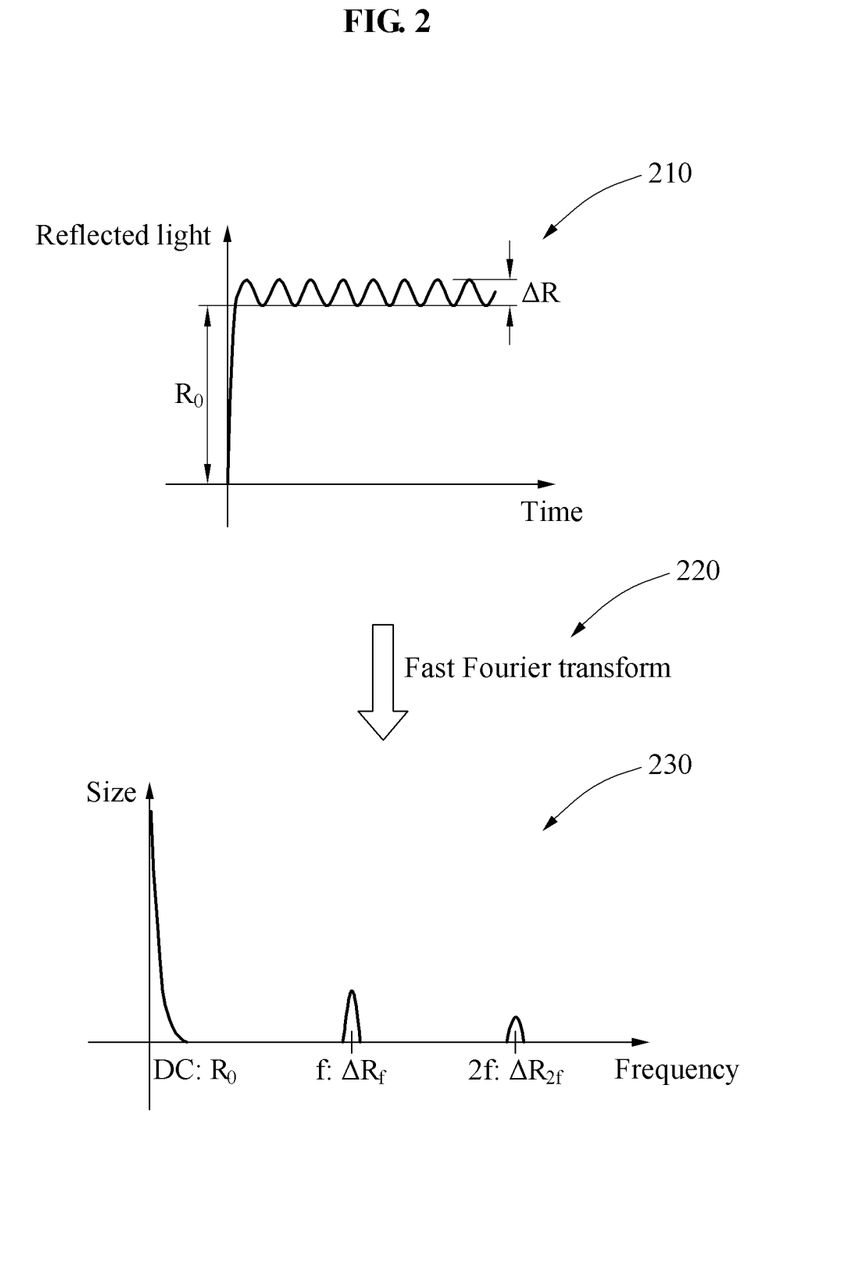
FIG. 2 is a diagram illustrating a frequency domain signal according to an example embodiment.

FIG. 2 is a diagram illustrating a frequency domain signal according to an example embodiment.

As illustrated in a graph 210 of FIG. 2, the detector 120 may detect a periodical change in a signal of interest. As further discussed below, the controller 130 may extract $R_0+\Delta R_{DC}$ and $\Delta R_f$ when filtering a frequency domain signal.

The controller 130 may calculate a relative amount of change in reflectivity of a sample using a signal having been converted into a frequency domain.

Referring back to FIG. 1, the controller 130 may convert the signal of interest into the frequency domain signal. Specifically, the controller 130 may restore an amount of change in intensity of the signal of interest detected by the detector 120, to be a digital signal using a digitizer. The controller 130 may convert the digital signal into a frequency domain signal 230 through a fast Fourier transform 220. The frequency domain signal may be an amount of change in intensity of a signal of interest as a function of a frequency, for example, an amount of change in reflectivity of a sample.

The controller 130 may filter the frequency domain signal. The controller 130 may extract a frequency component corresponding to a frequency of the bias signal 151 and a DC component from the frequency domain signal. The controller 130 may calculate a relative amount of change in reflectivity of the sample 115 from the extracted DC component and frequency component. For example, the controller 130 may extract $R_0+\Delta R_{DC}$ and $\Delta R_f$ when filtering the frequency domain signal. The controller 130 may calculate the relative amount of change in reflectivity using an equation of $\Delta R_f/(R_0+\Delta R_{DC})$, $R_0+\Delta R_{DC}$ being the extracted DC component, $\Delta R_{DC}$ being an amount of change in reflectivity at a DC, and $\Delta R_f$ being the extracted frequency component.

Also, the controller 130 may calculate the relative amount of change in reflectivity using an equation of $\Delta R_f/R_0$, $R_0$ being a reflectivity of the sample 115 to which the bias signal 151 is not applied to the sample and $\Delta R_f$ being the extracted frequency component. According to Equation 3, when a thermoreflectance coefficient is significantly small, $\Delta R$ may be smaller than R and thus, R may be substantially equal to $R_0$. Also, since $\Delta R_{DC}$ included in the DC component is significantly small, a DC component value may be approximately equal to $R_0$. $R_0$ may be the extracted DC component.

The controller 130 may acquire a thermal image of the sample 115 based on the relative amount of change in reflectivity. A value of each pixel in the thermal image may correspond to the relative amount of change in reflectivity. By two-dimensionally arranging the relative amount of change in reflectivity, the thermal image of the sample may be acquired.

The collector 110 may scan the region of interest of the sample 115 based on a first control signal indicating a start and an end of an image and a second control signal indicating a start and an end of a row or a column of the image. In this example, the image may not have a pixel value. The pixel value of the image may be a calculated relative amount of change in reflectivity. The controller 130 may transmit a control signal 132 to the galvanometer scanner 111 included in the collector 110 so as to be used for scanning.

When a period of a bias signal is less than a pixel unit time indicating a time corresponding to a unit pixel of the image, the controller 130 may calculate the relative amount of change in reflectivity of each pixel in the image based on values sampled during the pixel unit time of the corresponding pixel. Also, the controller 130 may acquire the thermal image by two-dimensionally arranging the pixel value based on the first control signal and the second control signal.

When the period of the bias signal is greater than or equal to a pixel unit time indicating a time corresponding to a unit pixel of the image, the controller 130 may sample the signal of interest at intervals of the pixel unit time. Also, the controller 130 may two-dimensionally arrange a reflectivity corresponding to the sampled signal of interest based on the first control signal and the second control signal, and acquire a plurality of reflection images. The controller 130 may calculate the relative amount of change in reflectivity based on a reflectivity corresponding to a pixel in the same location in the plurality of reflection images.

A temperature distribution measuring apparatus may obtain a thermoreflectance coefficient based on the relative amount of change in reflectivity and a thermoreflectance coefficient measurement method. Also, the temperature distribution measuring apparatus may acquire a temperature distribution image of the sample 115 by applying the thermoreflectance coefficient to the thermal image. Here, the acquired temperature distribution image may be a temperature distribution image of a surface of the sample 115.

Figure 3:
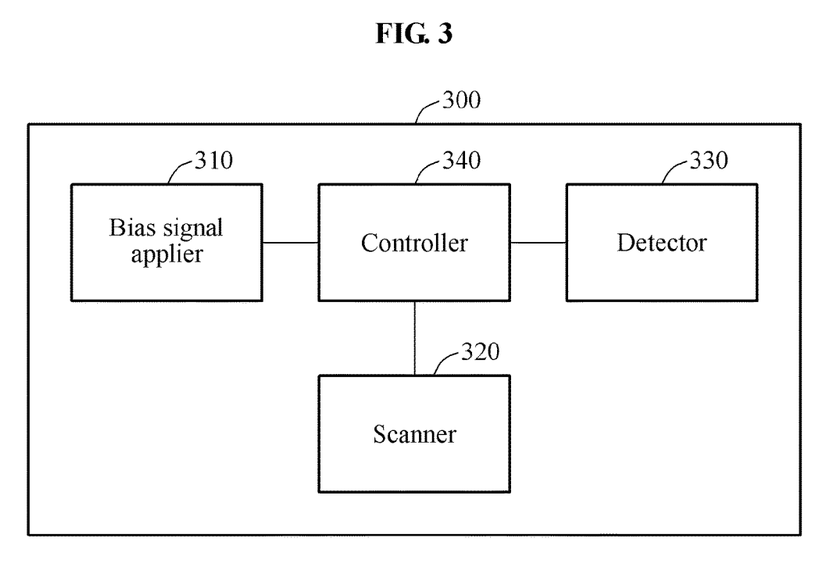
FIG. 3 is a diagram illustrating a temperature distribution measuring apparatus that applies a high-frequency bias signal or a low-frequency bias signal to a sample to acquire a thermal image of the sample according to an example embodiment.

FIG. 3 is a diagram illustrating a temperature distribution measuring apparatus that applies a high-frequency bias signal or a low-frequency bias signal to a sample to acquire a thermal image of the sample according to an example embodiment.

Referring to FIG. 3, a temperature distribution measuring apparatus 300 may include a bias signal applier 310, a scanner 320, a detector 330, and a controller 340.

The bias signal applier 310 may apply a bias signal to a sample for a change in reflectivity of a signal reflected from the sample.

The scanner 320 may scan the sample based on a first control signal indicating a start and an end of an image and a second control signal indicating a start and an end of a row or a column of the image.

The detector 330 may detect, from the reflection signal, a signal of interest reflected from a region of interest of the sample. The detector 330 may use a pinhole to detect the signal of interest.

The controller 340 may convert the signal of interest into a frequency domain signal and filter the frequency domain signal. Also, the controller 340 may extract a frequency component of the bias signal and a DC component from the frequency domain signal through the filtering. For example, the controller 340 may filter a signal having the same band of a frequency as that of frequencies of the DC component and the bias signal. The controller 340 may calculate a relative amount of change in reflectivity of the sample using the filtered. DC component and a signal having a frequency component the same as the frequency of the bias signal. The controller 340 may calculate the relative amount of change in reflectivity using an equation of $\Delta R_f/R_0$, $R_0$ being the DC component included in the frequency domain signal and $\Delta R_f$ being the frequency component of the bias signal included in the frequency domain signal. The controller 340 may determine a pixel value of an image to be the relative amount of change and acquire a thermal image of the sample.

Figure 4A:
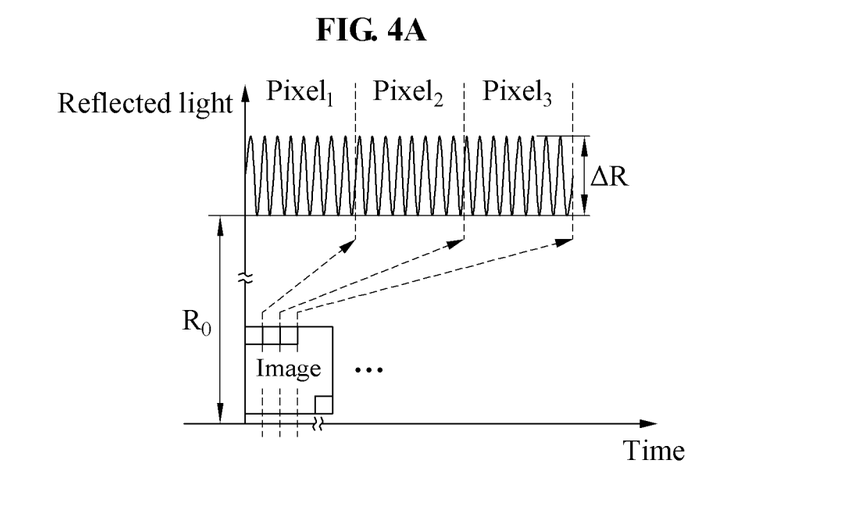
FIGS. 4A and 4B are diagrams illustrating a method of processing a frequency domain signal when a high-frequency bias signal is used according to an example embodiment.
Figure 4B:
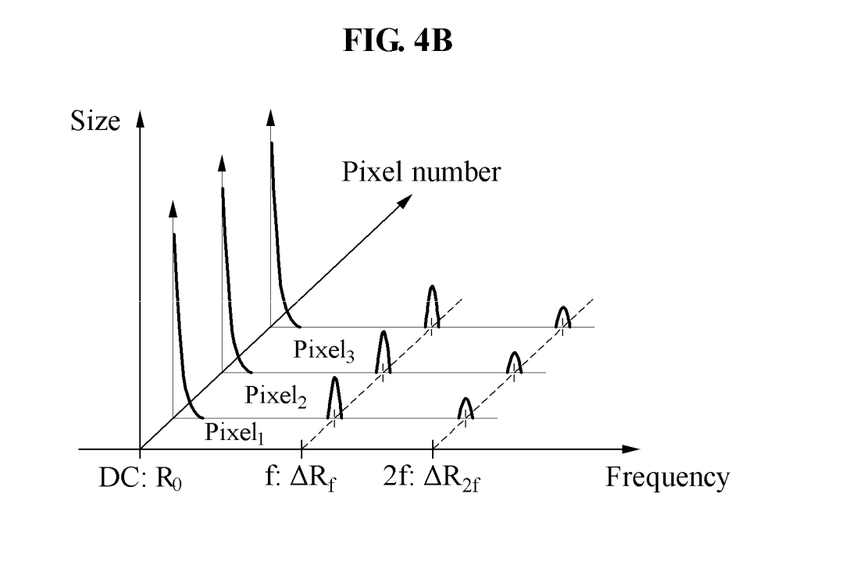

When the bias signal applied to the sample is a high-frequency signal, the temperature distribution measuring apparatus 300 may include a low-speed non-resonant galvanometer scanner and a high-speed digitizer. Related descriptions will be provided with reference to FIG. 4.

FIGS. 4A and 4B are diagrams illustrating a method of processing a frequency domain signal when a high-frequency bias signal is used according to an example embodiment. When a period of a bias signal is less than a pixel unit time indicating a time corresponding to a unit pixel of an image, the bias signal may be a high-frequency bias signal.

A signal output from a light detector of a temperature distribution measuring apparatus may include a reflected-light-intensity-change signal corresponding to at least one period per pixel unit time. The temperature distribution measuring apparatus may restore the reflected-light-intensity-change signal using a digitizer. A restored signal may be filtered to obtain a desired frequency component value after a fast Fourier transform. The temperature distribution measuring apparatus may include a low-speed non-resonant galvanometer scanner to readily satisfy a relatively long pixel unit time of the image and a high-speed digitizer to sufficiently sample a fast change in intensity of a reflected light.

The temperature distribution measuring apparatus may induce a periodical change in reflectivity of a signal of interest or a reflection signal in a region of interest of a sample by applying a bias signal having a predetermined frequency f to the sample. In this case, the frequency of the bias signal may need to be sufficiently high such that numerous, for example, at least 10 bias signals are applied during a period of time corresponding to a single pixel of the image.

A galvanometer scanner of the temperature distribution measuring apparatus may perform a raster scanning on the region of interest of the sample based on a control signal indicating a start and an end of the image and a control signal indicating a start and an end of each line of the image.

The temperature distribution measuring apparatus may allow only a signal of interest reflected from the region of interest to pass a pinhole. The temperature distribution measuring apparatus may use the light detector to detect a reflected-light signal, for example, the signal of interest of which an intensity is changed periodically.

In FIG. 4A, the temperature distribution measuring apparatus may use a digitizer to sample an analog output signal of the light detector which is quickly changed during the pixel unit time of the image. The temperature distribution measuring apparatus may restore, to be a digital signal, the reflected-light signal that is periodically changed based on the bias signal applied during the pixel unit time.

As illustrated in FIG. 4B, the temperature distribution measuring apparatus may obtain a frequency(f) component value of a bias signal and a DC component value in Fourier domain(frequency domain) after fast Fourier transform. The temperature distribution measuring apparatus may calculate a relative amount of change in reflectivity for each pixel unit time. The temperature distribution measuring apparatus may apply the calculated relative amount of change in reflectivity to a pixel value of an image. The temperature distribution measuring apparatus may acquire a thermal distribution image by two-dimensionally arranging each pixel value based on the control signals associated with the image and the line of the image.

The temperature distribution measuring apparatus may measure a relative amount of change in intensity of the reflected light according to an increase in temperature of the sample. The temperature distribution measuring apparatus may obtain a thermoreflectance coefficient based on the measured relative amount of change and a thermoreflectance coefficient measurement method. The temperature distribution measuring apparatus may acquire a temperature distribution image of the sample by applying the thermoreflectance coefficient to the thermal distribution image.

Referring back to FIG. 3, when a low-frequency signal is applied to the sample, the temperature distribution measuring apparatus may include a high-speed resonant galvanometer scanner and a low-speed digitizer. Related descriptions will be provided with reference to FIGS. 5A through 5C.

Figure 5A:
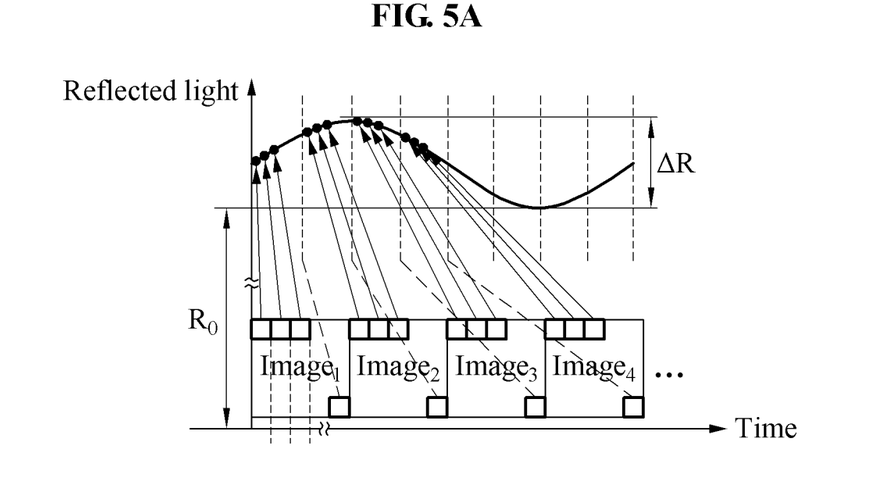
FIGS. 5A through 5C are diagrams illustrating a method of processing a frequency domain signal when a low-frequency bias signal is used according to an example embodiment.
Figure 5B:
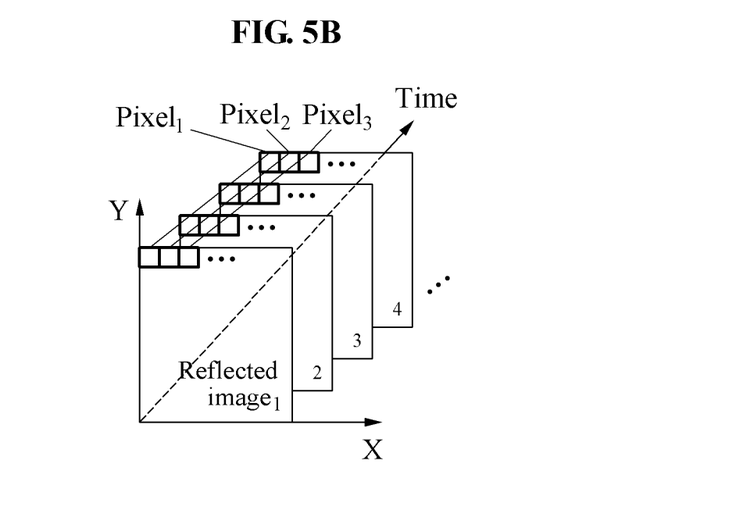
Figure 5C:
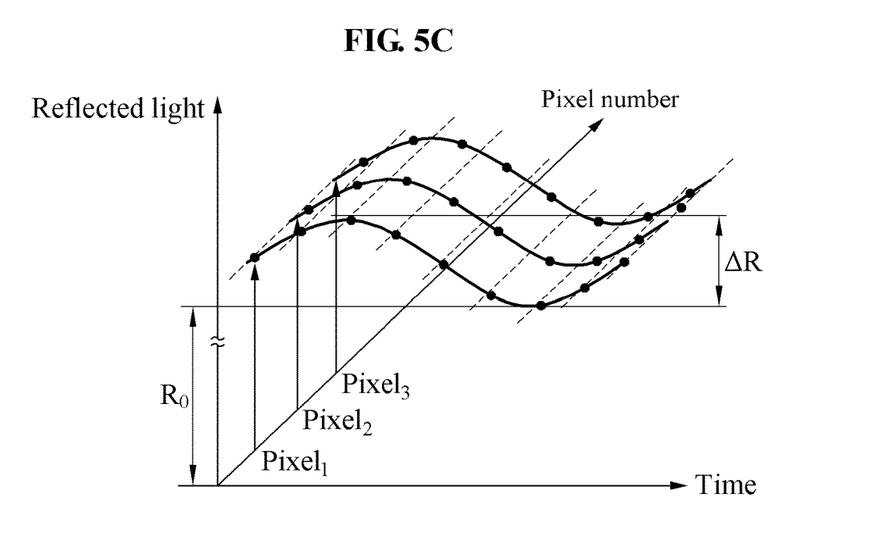

FIGS. 5A through 5C are diagrams illustrating a method of processing a frequency domain signal when a low-frequency bias signal is used according to an example embodiment. When a period of a bias signal is greater than or equal to a pixel unit time indicating a time corresponding to a pixel of an image, the bias signal may be a low-frequency bias signal.

When the low-frequency bias signal is applied to the foregoing example of FIGS. 4A and 4B, a time of acquiring a thermal image of a sample may be prolonged. When monitoring a sample to which the low-frequency bias signal is to be applied, a temperature distribution measuring apparatus may include a high-speed resonant galvanometer scanner that reduces the pixel unit time of the image to quickly acquire the image. Also, the temperature distribution measuring apparatus may include a low-digitizer to sample a slow change in intensity of a reflected light.

In FIG. 5A, a controller of the temperature distribution measuring apparatus may sample an output signal of a light detector for each pixel unit time of the image to continuously acquire a reflection image. The controller may arrange pixel values in the same location of all acquired reflection images to restore a reflected-light signal changing periodically. The controller may obtain a desired frequency component through filtering after a fast Fourier transform. Hereinafter, an operation of the temperature distribution measuring apparatus will be described in detail.

A bias signal applier of the temperature distribution measuring apparatus may apply a bias signal of a predetermined frequency f to the sample. The temperature distribution measuring apparatus may induce a periodical change in reflectivity in a region of interest of the sample. In this example, the frequency of the bias signal may be less than a speed of acquiring a single image.

A galvanometer scanner of the temperature distribution measuring apparatus may perform a raster scanning on the region of interest of the sample based on a control signal indicating a start and an end of the image and a control signal indicating a start and an end of each line of the image.

The temperature distribution measuring apparatus may allow only a signal of interest reflected from the region of interest to pass a pinhole. The temperature distribution measuring apparatus may use the light detector to detect a reflected-light signal, for example, the signal of interest of which an intensity is changed periodically.

In FIG. 5A, the temperature distribution measuring apparatus may use a digitizer to sample an analog output signal of the light detector for each pixel unit time of the image. The temperature distribution measuring apparatus may restore a reflected-light intensity value for a predetermined instance. The temperature distribution measuring apparatus may two-dimensionally arrange the restored reflected-light intensity value into each pixel based on the control signals associated with the image and the line. As illustrated in FIG. 5B, the temperature distribution measuring apparatus may acquire a single reflection image through the two-dimensional arranging. The temperature distribution measuring apparatus may acquire a plurality of reflection images by repetitively performing an operation of sampling, restoring, and two-dimensionally arranging.

In FIG. 5C, values of pixels in the same location in reflection images acquired continuously may be the same as a value restored by sampling a reflected-light signal periodically changing at a location of the sample corresponding to the location of the pixel at an image acquiring speed using the digitizer. The temperature distribution measuring apparatus may perform the fast Fourier transform on the values of the pixels in the same location. The temperature distribution measuring apparatus may extract a DC component value and a frequency(f) component value in the transformed signal. The temperature distribution measuring apparatus may calculate a relative amount of change in reflectivity of the sample using an extracted value for each of the pixels in the same location, and apply the calculated relative amount of change in reflectivity of the sample to a value of the corresponding pixel in the image. The temperature distribution measuring apparatus may acquire a thermal distribution image of the sample by two-dimensionally arranging the pixel values based on the control signals associated with the image and the line.

The temperature distribution measuring apparatus may measure a relative amount of change in intensity of the reflected light according to an increase in temperature of the sample. The temperature distribution measuring apparatus may obtain a thermoreflectance coefficient based on the measured relative amount of change and a thermoreflectance coefficient measurement method. The temperature distribution measuring apparatus may acquire a temperature distribution image of the sample by applying the thermoreflectance coefficient to the thermal distribution image.

The temperature distribution measuring apparatus may obtain a thermoreflectance coefficient using the relative amount of change in reflectivity based on the thermoreflectance coefficient measurement method. Also, the temperature distribution measuring apparatus may acquire a temperature distribution image of the sample by applying the thermoreflectance coefficient to the thermal image. Here, the acquired temperature distribution image may be a temperature distribution image of a surface of the sample.

Figure 6:
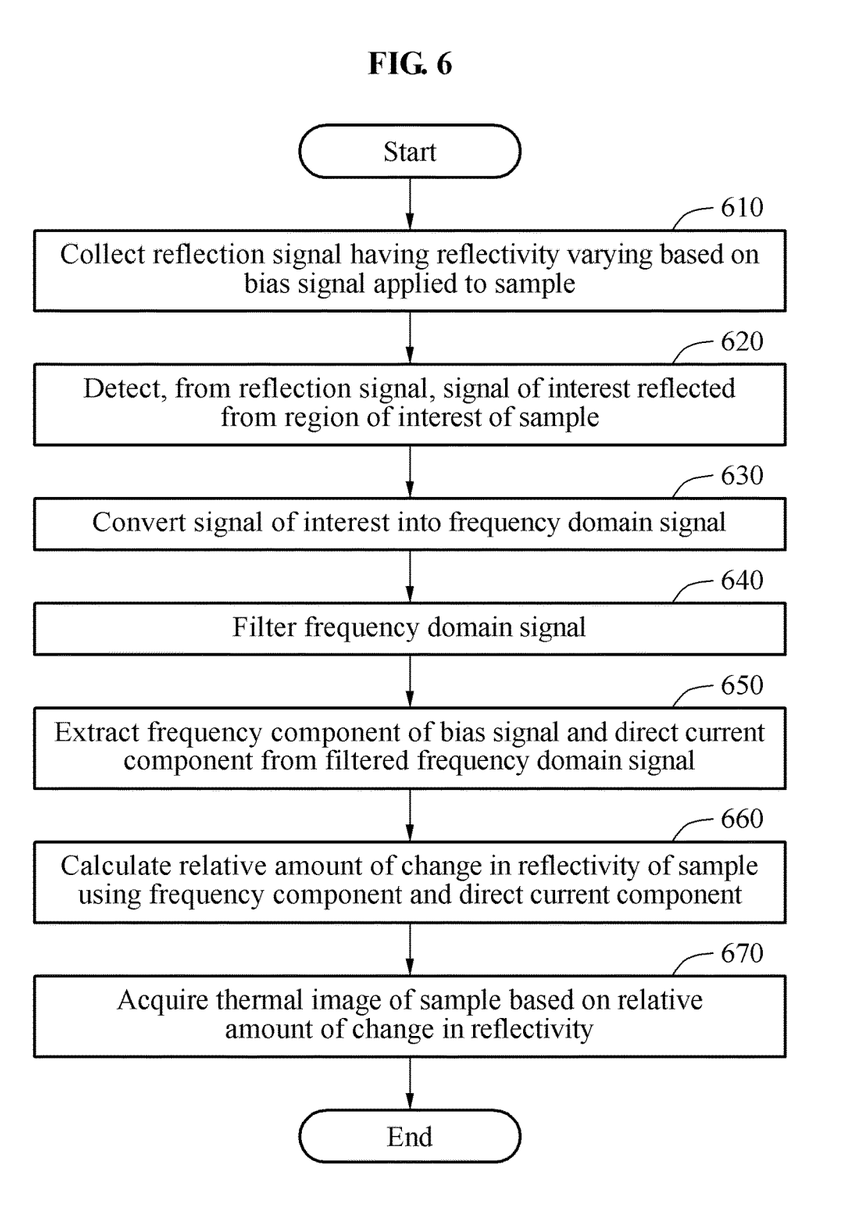
FIG. 6 is a flowchart illustrating a method of measuring a temperature distribution according to an example embodiment.

FIG. 6 is a flowchart illustrating a method of measuring a temperature distribution according to an example embodiment. The method of measuring a temperature distribution may be performed by a temperature distribution measuring apparatus.

In operation 610, the temperature distribution measuring apparatus may collect a reflection signal having a reflectivity varying based on a bias signal applied to a sample.

In operation 620, the temperature distribution measuring apparatus may detect, from the reflection signal, a signal of interest reflected from a region of interest of the sample.

In operation 630, the temperature distribution measuring apparatus may convert the signal of interest into a frequency domain signal.

In operation 640, the temperature distribution measuring apparatus may filter the frequency domain signal.

In operation 650, the temperature distribution measuring apparatus may extract a frequency component of the bias signal and a DC component from the filtered frequency domain signal. The temperature distribution measuring apparatus may extract a frequency component $\Delta R_f$ of a bias signal and a DC component $R_0 + \Delta R_{DC}$ when filtering the frequency domain signal.

In operation 660, the temperature distribution measuring apparatus may calculate a relative amount of change in reflectivity of the sample using the extracted frequency component and DC component. The temperature distribution measuring apparatus may calculate the relative amount of change in reflectivity using an equation of $\Delta R_f/(R_0 + \Delta R_{DC})$, $\Delta R_{DC}$ being an amount of change in reflectivity at a DC.

Also, the temperature distribution measuring apparatus may calculate the relative amount of change in reflectivity using an equation of $\Delta R_f/R_0$, $R_0$ being a reflectivity of the sample to which the bias signal 151 is not applied to the sample and $\Delta R_f$ being the extracted frequency component. According to Equation 3, when a thermoreflectance coefficient is significantly small, $\Delta R$ may be smaller than R and thus, R may be substantially equal to $R_0$. Also, since $\Delta R_{DC}$ included in the DC component is significantly small, a DC component value may be approximately equal to $R_0$. $R_0$ may be the extracted DC component.

In operation 670, the temperature distribution measuring apparatus may acquire a thermal image of the sample based on the relative amount of change in reflectivity. A value of each pixel in the thermal image may correspond to the relative amount of change in reflectivity. By two-dimensionally arranging the relative amount of change in reflectivity, the thermal image of the sample may be acquired.

The temperature distribution measuring apparatus may scan the region of interest of the sample 115 based on based on a first control signal indicating a start and an end of an image and a second control signal indicating a start and an end of a row or a column of the image.

When a period of a bias signal is less than a pixel unit time indicating a time corresponding to a unit pixel of the image, the temperature distribution measuring apparatus may the relative amount of change in reflectivity of each pixel in the image as a pixel value of the corresponding pixel. Also, the temperature distribution measuring apparatus may acquire the thermal image by two-dimensionally arranging the pixel value based on the first control signal and the second control signal.

When the period of the bias signal is greater than or equal to a pixel unit time indicating a time corresponding to a pixel of the image, the temperature distribution measuring apparatus may sample the signal of interest at intervals of the pixel unit time. Also, the temperature distribution measuring apparatus may two-dimensionally arrange a reflectivity corresponding to the sampled signal of interest based on the first control signal and the second control signal, and acquire a plurality of reflection images. The temperature distribution measuring apparatus may calculate the relative amount of change in reflectivity based on a reflectivity corresponding to a pixel in the same location in the plurality of reflection images.

The temperature distribution measuring apparatus may obtain the thermoreflectance coefficient based on the relative amount of change in reflectivity and a thermoreflectance coefficient measurement method. Also, the temperature distribution measuring apparatus may acquire a temperature distribution image of the sample by applying the thermoreflectance coefficient to the thermal image. Here, the acquired temperature distribution image may be a temperature distribution image of a surface of the sample.

Since the descriptions of FIGS. 4 and 5 are also applicable here, repeated description of FIG. 6 will be omitted.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined, manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A temperature distribution measuring apparatus comprising:
    a collector configured to collect a reflection signal having a reflectivity varying based on a bias signal applied to a sample;
    a detector configured to detect, from the reflection signal, a signal of interest reflected from a region of interest of the sample; and
    a controller configured to convert the signal of interest into a frequency domain signal, calculate a relative amount of change in reflectivity of the sample using a frequency component of the bias signal and a direct current component extracted based on a filtering of the frequency domain signal, and acquire a thermal image of the sample based on the relative amount of change in reflectivity.

2. The temperature distribution measuring apparatus of claim 1, wherein the detector includes at least one pinhole.

3. The temperature distribution measuring apparatus of claim 1, wherein the controller is configured to calculate the relative amount of change in reflectivity using an equation $\Delta R_f/R_0$, $R_0$ being the direct current component included in the frequency domain signal and $\Delta R_f$ being the frequency component of the bias signal included in the frequency domain signal.

4. The temperature distribution measuring apparatus of claim 1, wherein the collector is configured to scan the region of interest of the sample based on a first control signal indicating a start and an end of an image and a second control signal indicating a start and an end of a row or a column of the image.

5. The temperature distribution measuring apparatus of claim 4, wherein when a period of the bias signal is less than a pixel unit time which is a time corresponding to a unit pixel of the image, the controller is configured to use the relative amount of change in reflectivity for each pixel of the image as a pixel value of the each pixel and acquire the thermal image by two-dimensionally arranging the pixel value based on the first control signal and the second control signal.

6. The temperature distribution measuring apparatus of claim 4, wherein when a period of the bias signal is greater than or equal to a pixel unit time which is a time corresponding to a unit pixel of the image, the controller is configured to sample the signal of interest for each pixel unit time and acquire a plurality of reflection images by two-dimensionally arranging a reflectivity corresponding to the sampled signal of interest based on the first control signal and the second control signal.

7. The temperature distribution measuring apparatus of claim 6, wherein the controller is configured to calculate the relative amount of change in reflectivity based on the reflectivity corresponding to a pixel in the same location in the plurality of reflection images.

8. The temperature distribution measuring apparatus of claim 1, wherein the controller is configured to obtain a thermoreflectance coefficient based on the relative amount of change in reflectivity and a thermoreflectance coefficient measurement method, and acquire a temperature distribution image of the sample by applying the thermoreflectance coefficient to the thermal image.

9. A temperature distribution measuring apparatus comprising:
a bias signal applier configured to apply a bias signal to a sample for a change in reflectivity of a reflection signal reflected from the sample;
a scanner configured to scan the sample based on a first control signal indicating a start and an end of an image and a second control signal indicating a start and an end of a row or a column of the image;
a detector configured to detect, from the reflection signal, a signal of interest reflected from a region of interest of the sample; and
a controller configured to convert the signal of interest into a frequency domain signal, calculate a relative amount of change in reflectivity of the sample using a frequency component of the bias signal and a direct current component extracted based on a filtering of the frequency domain signal, determine a pixel value of the image as the relative amount of change in reflectivity, and acquire a thermal image of the sample.

10. The temperature distribution measuring apparatus of claim 9, wherein the controller is configured to calculate the relative amount of change in reflectivity using an equation $\Delta R_f/R_0$, $R_0$ being the direct current component included in the frequency domain signal and $\Delta R_f$ being the frequency component of the bias signal included in the frequency domain signal.

11. The temperature distribution measuring apparatus of claim 9, wherein when a period of the bias signal is less than a pixel unit time which is a time corresponding to a unit pixel of the image, the controller is configured to use the relative amount of change in reflectivity for each pixel of the image as a pixel value of the each pixel and acquire the thermal image by two-dimensionally arranging the pixel value based on the first control signal and the second control signal.

12. The temperature distribution measuring apparatus of claim 9, wherein when a period of the bias signal is greater than or equal to a pixel unit time which is a time corresponding to a unit pixel of the image, the controller is configured to sample the signal of interest for each pixel unit time and acquire a plurality of reflection images by two-dimensionally arranging a reflectivity corresponding to the sampled signal of interest based on the first control signal and the second control signal.

13. The temperature distribution measuring apparatus of claim 12, wherein the controller is configured to calculate the relative amount of change in reflectivity based on the reflectivity corresponding to a pixel in the same location in the plurality of reflection images.

14. The temperature distribution measuring apparatus of claim 9, wherein the controller is configured to obtain a thermoreflectance coefficient based on the relative amount of change in reflectivity and a thermoreflectance coefficient measurement method, and acquire a temperature distribution image of the sample by applying the thermoreflectance coefficient to the thermal image.

15. A temperature distribution measurement method comprising:
collecting a reflection signal having a reflectivity varying based on a bias signal applied to a sample;
detecting, from the reflection signal, a signal of interest reflected from a region of interest of the sample;
converting the signal of interest into a frequency domain signal and calculating a relative amount of change in reflectivity of the sample using a frequency component of the bias signal and a direct current component extracted based on a filtering of the frequency domain signal; and
acquiring a thermal image of the sample based on the relative amount of change in reflectivity.

16. The temperature distribution measurement method of claim 15, wherein the converting of the signal of interest into a frequency domain signal includes calculating the relative amount of change in reflectivity using an equation $\Delta R_f/R_0$, $R_0$ being the direct current component included in the frequency domain signal and $\Delta R_f$ being the frequency component of the bias signal included in the frequency domain signal.

17. The temperature distribution measurement method of claim 15, further comprising:
scanning the region of interest of the sample based on a first control signal indicating a start and an end of an image and a second control signal indicating a start and an end of a row or a column of the image.

18. The temperature distribution measurement method of claim 17, wherein when a period of the bias signal is less than a pixel unit time which is a time corresponding to a unit pixel of the image, the acquiring of the thermal image includes using the relative amount of change in reflectivity for each pixel of the image as a pixel value of the each pixel and acquiring the thermal image by two-dimensionally arranging the pixel value based on the first control signal and the second control signal.

19. The temperature distribution measurement method of claim 17, wherein when a period of the bias signal is greater than or equal to a pixel unit time which is a time corresponding to a unit pixel of the image, the converting of the signal of interest into a frequency domain signal includes sampling the signal of interest for each pixel unit time, acquiring a plurality of reflection images by two-dimensionally arranging a reflectivity corresponding to the sampled signal of interest based on the first control signal and the second control signal, and calculating the relative amount of change in reflectivity based on the reflectivity corresponding to a pixel in the same location in the plurality of reflection images.

20. The temperature distribution measurement method of claim 15, further comprising:
    obtaining a thermoreflectance coefficient based on the relative amount of change in reflectivity and a thermoreflectance coefficient measurement method and acquiring a temperature distribution image of the sample by applying the thermoreflectance coefficient to the thermal image.

* * * * *